United States Patent [19]
Hanning et al.

[11] 4,053,800
[45] Oct. 11, 1977

[54] STATOR FOR ELECTRIC MOTOR

[75] Inventors: Michael Hanning, Oerlinghausen; Fritz Mehrmann, Augustdorf, both of Germany

[73] Assignee: Hanning Elektro Werke Robert Hanning, Bielefeld, Germany

[21] Appl. No.: 641,657

[22] Filed: Dec. 17, 1975

[30] Foreign Application Priority Data
Dec. 21, 1974 Germany .............................. 2460964

[51] Int. Cl.² .............................................. H02K 1/04
[52] U.S. Cl. ........................................ 310/43; 310/42; 310/260
[58] Field of Search .................... 310/42, 43, 157, 166, 310/254, 260, 270

[56] References Cited
U.S. PATENT DOCUMENTS 1,875,207  8/1932  Apple .................................. 310/43 X
2,445,986  7/1948  Adamson ............................. 310/42

Primary Examiner—Donovan F. Duggan
Attorney, Agent, or Firm—Karl F. Ross

[57] ABSTRACT

An electric machine has a stack of stator plates forming a central throughgoing passage defining an axis and having an array of inwardly open and insulated axial grooves in the passage. A plurality of stator coils together form a tubular stator winding have a generally cylindrical central portion lying in the grooves, one end portion formed as a dome with a central aperture at the axis to one axial side of the stack, and another end portion of cylindrical slope to the other axial side of the stack. The domed end portion of the stator coil is secured together and physically stabilized by means of insulating lacquer and/or a domed insulating cage received within the domed end portion and mainly of smaller inside diameter than the outside diameter of a rotor within the stator coil.

9 Claims, 9 Drawing Figures

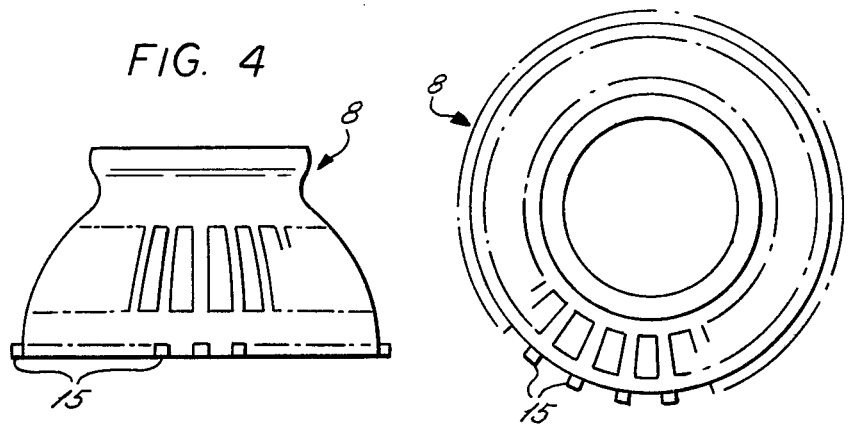
FIG. 4
FIG. 5
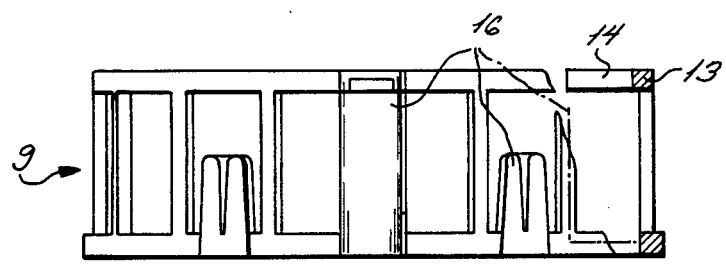
FIG. 6
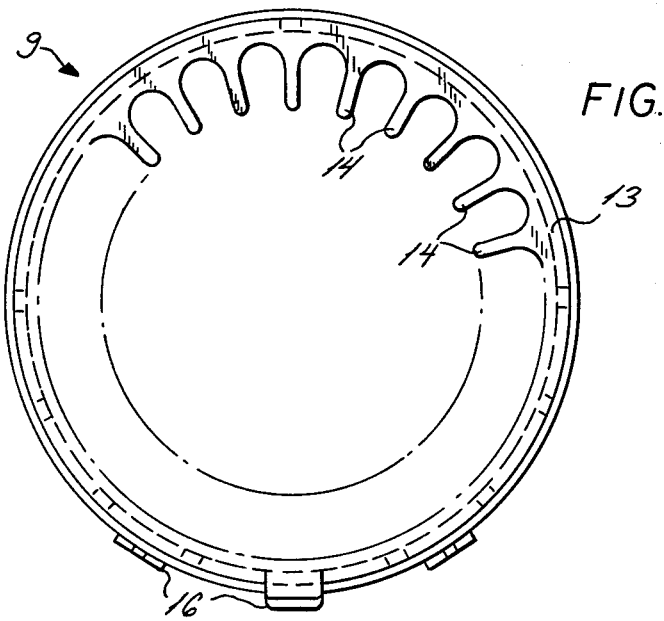
FIG. 7

STATOR FOR ELECTRIC MOTOR

FIELD OF THE INVENTION

The present invention relates to an electric machine. More particularly this invention concerns an electric motor or generator having a stator surrounding a rotor, assembling the stator of such a machine.

BACKGROUND OF THE INVENTION

A known electric machine is usable as an alternating-current of direct-current motor or generator and having a rotor surrounded by a stator. A stack or pack of stator plates have a central passage defining an axis and the stack is formed along its inner periphery with an array of grooves parallel to the axis. A stator winding consisting of a plurality of coils is fitted to this stator stack, with the bundles of wire of the coils lying in the grooves so as to surround the rotor when the machine is in use.

The bights of the coils forming the stator winding lie to either axial side of the stator-sheet pack. These winding heads to either side of the pack are typically widened somewhat to an internal diameter somewhat greater than the outer diameter of the rotor so that this rotor may be fitted into the stator from either end. The grooves within the stator-sheet stack are usually lined with insulating material.

As a result of this configuration it is necessary to make the stator coils relatively long. This extra length is needed at the ends in order to bend them outwardly and prevent too tight crimping of the conductors. Thus a considerable quantity of conductive material, usually copper, is employed in the stator winding which serves no useful function, merely increasing cost.

Another difficulty with such prior-art arrangements is that the stator winding is difficult to assemble. The individual windings must be painstakingly laid in place on the stator-sheet stack. Thereafter the ends of the winding must be bent outwardly. This latter operation is usually carried out manually with the aid of a so-called support cage on which the outer peripheries of the stator-winding heads rest. See German offenlegungs-schrift 2,134,523.

OBJECTS OF THE INVENTION

It is therefore an object of the present invention to provide an improved electric machine.

Yet another object is the provision of an improved stator for such a machine as well as a method of making such a.

Yet another object is the provision of a stator which can be readily assembled and which costs substantially less than a stator of equivalent magnetic characteristics.

SUMMARY OF THE INVENTION

These objects are attained according to this invention in a stator wherein one end of the stator winding is formed into a dome having a central hole or aperture in line with the rotation axis of the rotor. In the assembled electric machine one shaft of the rotor passes out of this hole in the done. The other end of the stator winding is cylindrical or outwardly flared. The domed end is stabilized either by saturating it with a hardenable insulating material and/or by providing within this domed end a domed support cage resting on the end of the stator-sheet stack. With this construction it is possible to reduce the length of the conductors in the stator field coil and thereby achieve a substantial saving. Furthermore the fabrication of such a stator is relatively simple in that the stator winding, one end of which has been formed into a dome, can be pushed on a mandrel as a single unit into the stator stack.

The domed insert fitting within the domed end of the stator winding in accordance with this invention is of evenly decreasing diameter from the stator stack outward. This insert is formed as a synthetic-resin cage having the shape of a body of revolution centered on the electric-machine axis.

According to other features of this invention the outside support cage for the other generally cylindrical end of the stator winding has or is formed integrally with an insulating ring. Radially inwardly extending projections on this ring engage between the circumferentially equispaced and inwardly open grooves formed inside the passage through the stator stack.

According to further features of this invention the domed support cage is unitarily formed with the insulating linings for the grooves. In addition the insulating ring overlying the opposite side of the stator-sheet stack is unitarily formed with the respective support ring that surrounds the winding head to this side of the stack. Furthermore the inner support dome is formed in accordance with this invention with radially outwardly extending projections each of which presses a respective coil into the respective groove. These projections lie axially within the passage or bore through the center of the stack.

The other support cage in accordance with this invention is generally cylindrical, even of L-shaped cross section so as to overreach the respective end of the winding and protect it. This support cage may be provided with mounts for the connections to the field winding, for thermal cutout switches, and other functions.

With the machine according to the present invention the two cages, the insulating ring, and the insulating groove linings are all made of synthetic-resin material. It is thus possible to form these pieces all separately or to unite some or all of them.

With the system according to the present invention the length of the field-core windings can be considerably reduced. This leads to a reduction in production costs as a result of a saving in expensive copper wire. In addition a greater surface for heat dissipation or cooling is left. Furthermore the production of such a stator is relatively simple.

BRIEF DESCRIPTION OF THE DRAWING

FIGS. 4 and 5 are side and end views, respectively, of the domed insert cage in accordance with this invention;

FIGS. 6 and 7 are side and end views, respectively, of the other cage in accordance with this invention;

SPECIFIC DESCRIPTION

Figure 1:
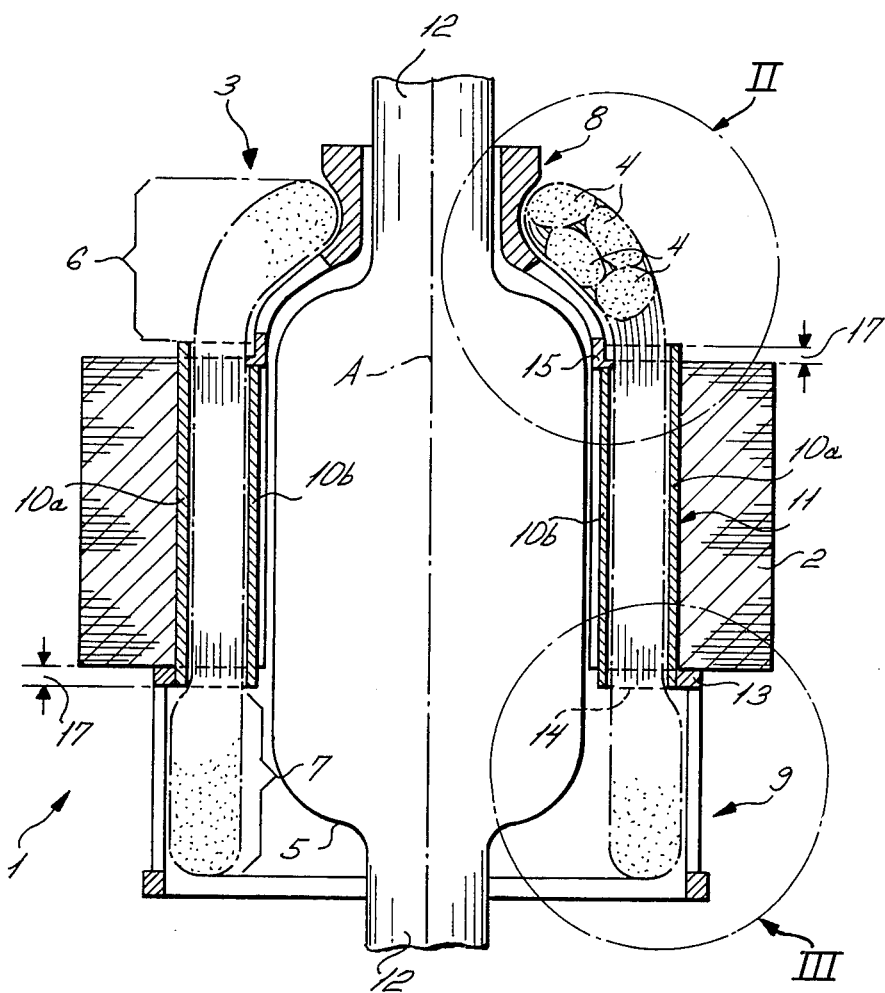
FIG. 1 is a longitudinal axial section through an electric machine in accordance with this invention.

The electric machine shown in FIG. 1 basically comprises a stator 1 formed of a stack 2 of ferromagnetic stator sheets carrying a field winding 3 having a plurality of coils 4. The stator 1 defines a central axis A about which turns a rotor 5.

The stator winding 3 is formed at one end with a domed extension 6 and at the other end with a generally cylindrical extension 7. The stack 2 is formed with a plurality, here twenty-four, axially extending grooves 11 insulated by a two-part synthetic-resin lining 10a and 10b. The rotor 5 has axial shafts 12 extending beyond the stator winding 3.

Figure 2:
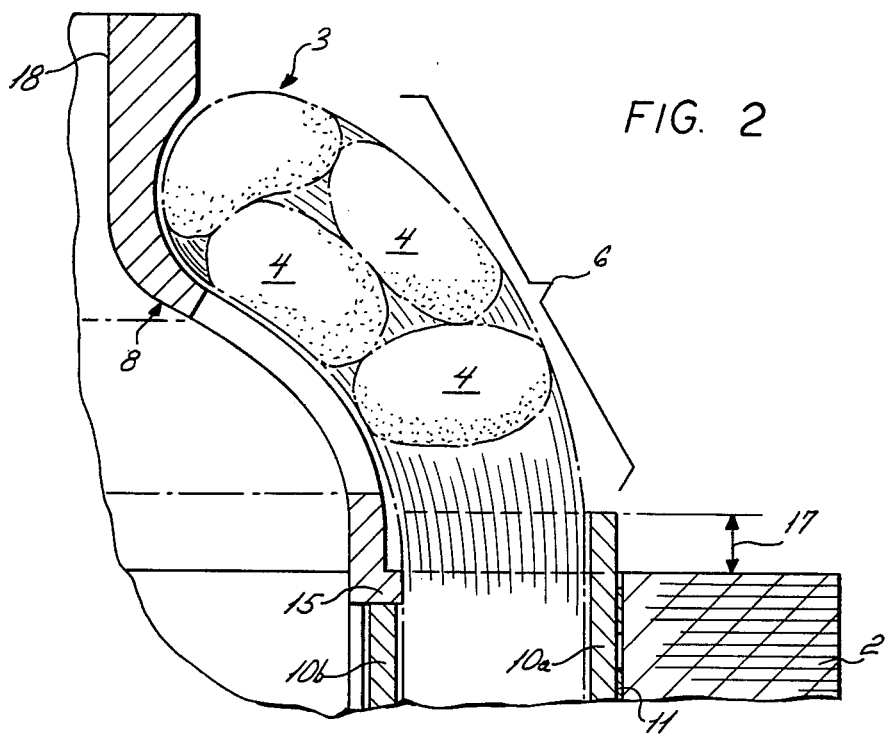
FIGS. 2 and 3 are large-scale views of details indicated by arrows II and III, respectively, of FIG. 1.
Figure 3:
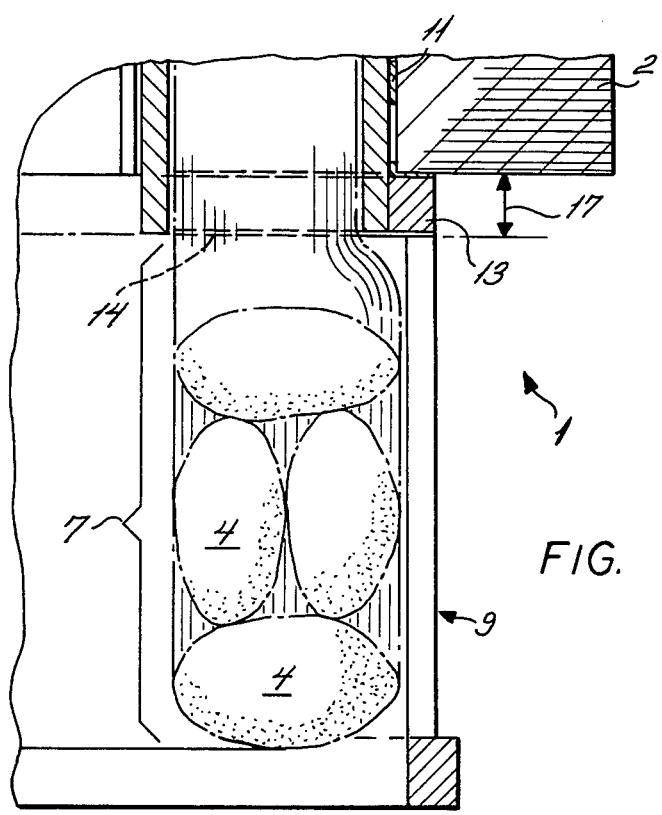

FIG. 2 shows how the domed end 6 of the stator winding 3 is supported on a synthetic-resin domed cage 8. FIG. 3 shows how the generally cylindrical end 7 is received within a generally cylindrical synthetic-resin cage 9 resting the axial opposite side of the pack 2.

The cage 8 as shown in FIGS. 4 and 5 is of decreasing internal diameter from the pack 2 outwardly, being almost entirely of a diameter substantially inferior to the outside diameter of the rotor 5. This cage 8 is also formed at its end with a throughgoing axial hole 18 snugly surrounding the respective shaft 12. In addition the cage 8 is formed on its lower edge with twenty four angularly equispaced radially outwardly extending projections 15 each alignable with a respective groove 11 so as to press a respective coil 14 into each groove. Cage 8 has an outside diameter at the projections 15 which is greater than the inside diameter of the passage through the pack 2, and has an axial length substantially greater than the height of the end 6 above the stack 2. The end 6 is permeated with hardened insulating lacquer so as further to stabilize it.

The cage 9 is unitarily formed with an insulating ring 13 which lies against the opposite side of the pack 2 and has as shown in FIGS. 6 and 7 a plurality of inwardly extending fingers 14 adapted to lie between the grooves 11. These fingers 14 prevent the bent-over coils 4 from making contact with the pack 2. Otherwise this cage 9 lies without the end 7 of the stator winding 3 and has a generally cylindrical shape.

The insulation 10a, formed as U-shaped channels, extends by a distance 17 beyond each axial face of the pack 2 so that bent-over coils 4 are held out of contact with the metallic sheets constituting the stack 2. Both elements 8 and 9 can be made according to the molding system described in the commonly assigned U.S. patent application 568,735 filed Apr. 16, 1975 by Michael HANNING, now U.S. Pat. No. 4,009,978 issued March 1977.

In addition as shown in FIG. 6 the cage 9 is provided with formations 16 that allow the contacts for the winding 3, a thermal-cutout switch, and the like to be seucred to this cage 9.

Figure 8:
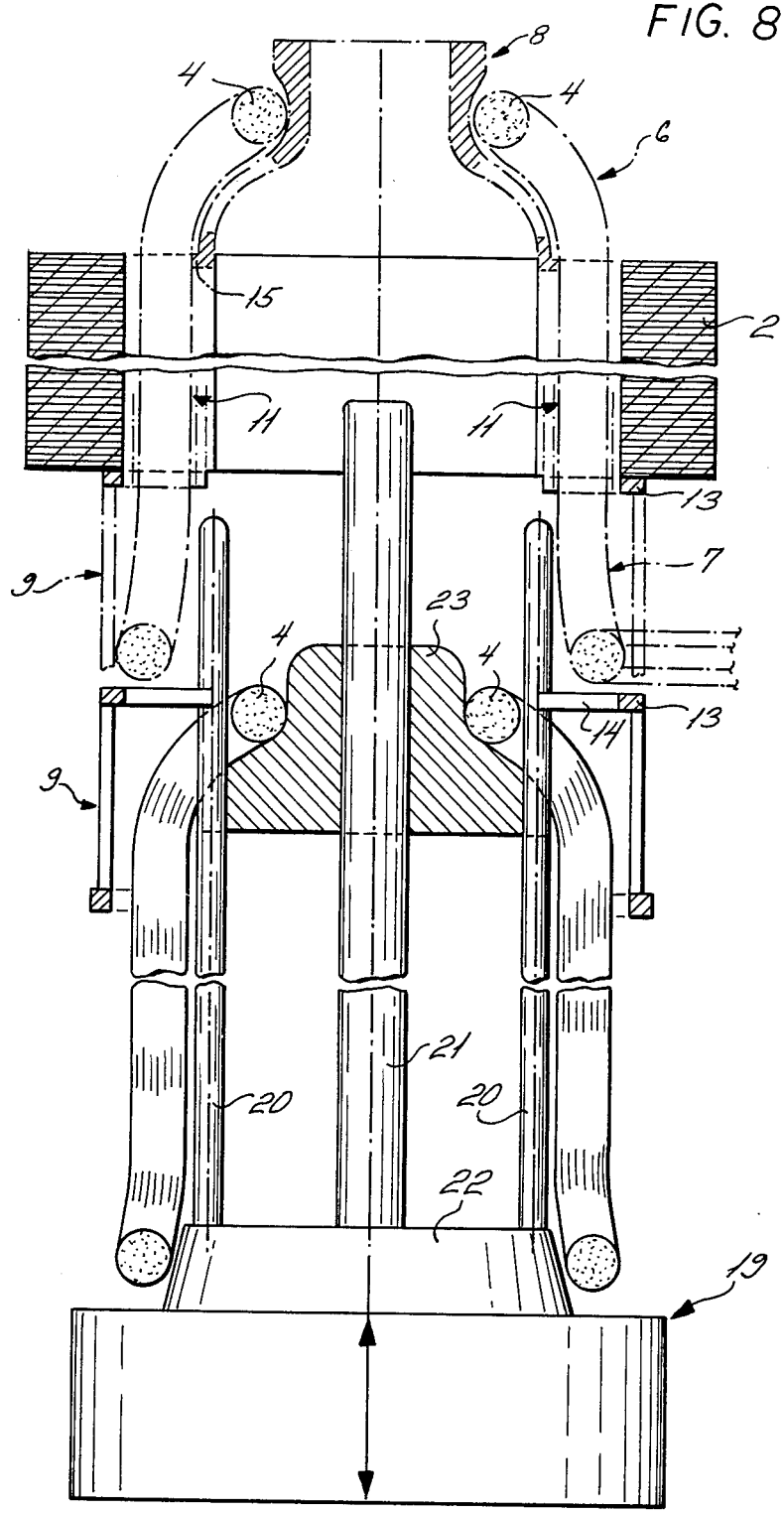
FIG. 8 is a side view illustrating assembly of the system according to the present invention.

FIG. 8 shows how the stator shown in FIGS. 1 – 3 is assembled. The coils 4 are mounted on a mandrel 19 consisting of a base 22 upwardly from which extend two or more parallel and spaced-apart rods 22 and a central rod 21 carrying a dome-shaped block 23. After the coils are formed into the desired dome shape the support cage 19 is slipped down over them and the entire assembly is forced through the central hole in the stator pack 2. The insert 8 may thereafter be applied to the arrangement.

Figure 9:
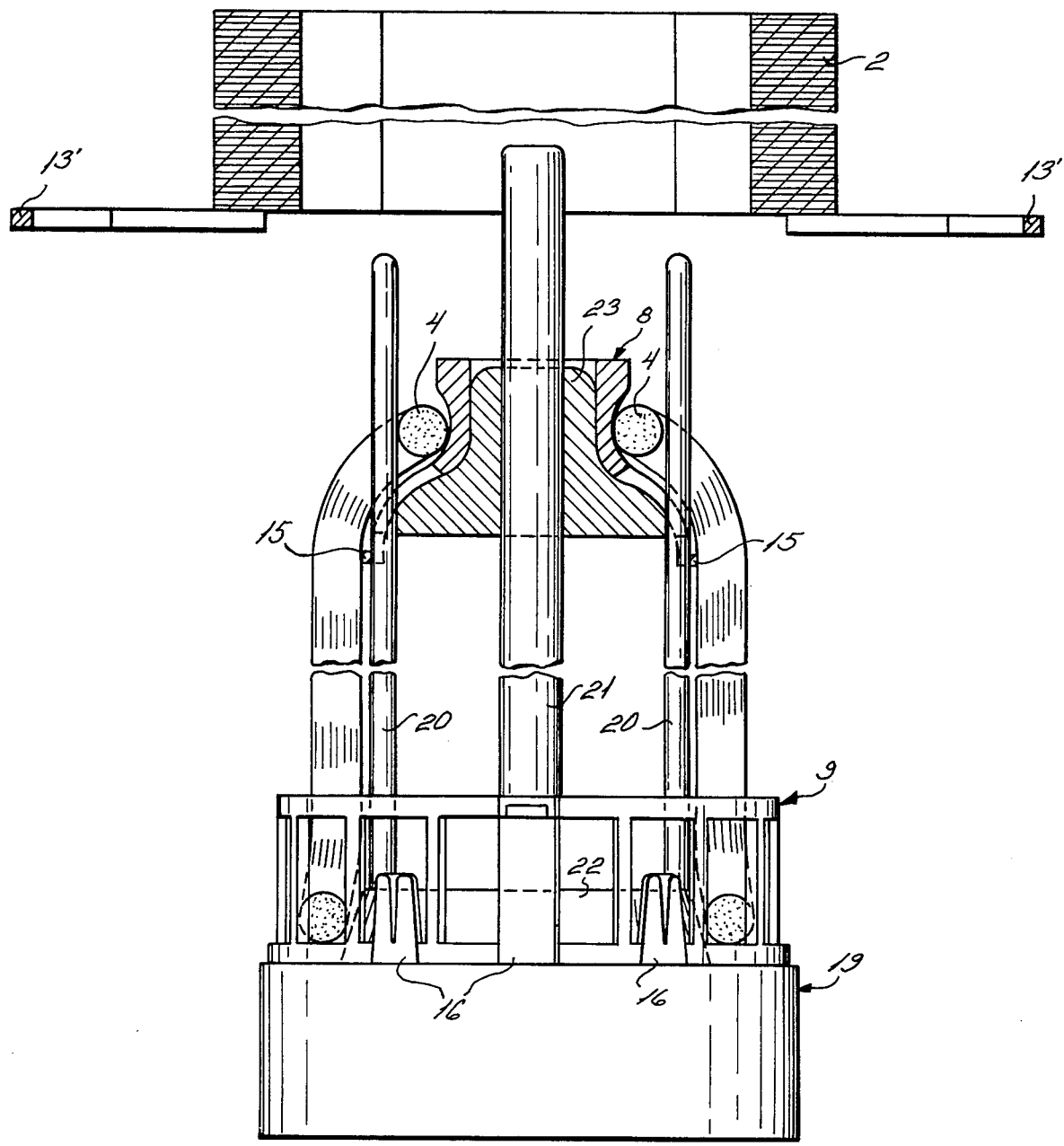
FIG. 9 is a view similar to FIG. 8 illustrating another assembly method in accordance with this invention.

FIG. 9 shows an identical arrangement wherein, however, the insert 8 has been fitted to the block 23 so that the entire arrangement can be forced through stator pack 2. In this arrangement also a segmental and separate insulating ring formed of segments 13' is employed which is assembled by displacing the section 13' radially inwardly toward the assembly. In both cases the upper portion 6 is sprayed with a hardening and insulating lacquer in order to stabilize the finished assembly.

We claim:

1. An electric machine comprising:
    a stack of stator plates having a central throughgoing passage defining an axis and an array of inwardly opening axial grooves in said passage;
    an insulating lining in each of said grooves;
    a plurality of stator coils forming a tubular stator winding having a generally cylindrical central portion lying in said grooves, an end portion formed as a dome with a central aperture at said axis to one axial side of said stack, and another end portion to the other axial side of said stack;
    means for securing together and physically stabilizing said coils at the domed end portion; and
    a rotor rotatable within said stator winding about said axis and having a shaft extending on said axis through said aperture of said domed end portion and another shaft extending on said axis in the opposite direction past said other end portion, said means for securing being an insert cage radially within said domed end portion and formed at least partially of a diameter substantially less than the inside diameter of said passage of said stack, said rotor having between said shafts a diameter corresponding generally to said inside diameter, said insert cage being formed as a body of revolution centered on said axis and of evenly decreasing inside diameter in an axial direction away from said stack.

2. The machine defined in claim 1 wherein said means for stabilizing is hardened insulating material throughout said domed end portion.

3. An electric machine comprising:
    a stack of stator plates having a central throughgoing passage defining an axis and an array of inwardly opening axial grooves in said passage;
    an insulating lining in each of said grooves;
    a plurality of stator coils forming a tubular stator winding having a generally cylindrical central portion lying in said grooves, and end portion formed as a dome with a central aperture at said axis to one axial side of said stack, and another end portion to the other axial side of said stack;
    means for securing together and physically stabilizing said coils at the domed end portion;
    a rotor rotatable within said stator winding about said axis and having a shaft extending on said axis through said aperture of said domed end portion and another shaft extending on said axis in the opposite direction past said other end portion, said means for securing being an insert cage radially within said domed end portion and formed at least partially of a diameter substantially less than the inside diameter of said passage of said stack, said rotor having between said shafts a diameter corresponding generally to said inside diameter; and
    a generally cylindrical support cage surrounding and supporting said other end portion, and a ring of insulating material lying against said stack and supporting said other end portion.

4. The machine defined in claim 3 wherein said insert cage is insulating and abuts said linings.

5. The machine defined in claim 4 wherein said insert cage is formed with an array of outwardly directed projections each pressing a respective coil into a respective groove.

6. The machine defined in claim 8 wherein each of said linings is formed to each axial side of said stack with an axial extension.

7. The machine defined in claim 3 wherein said ring is unitary with said cylindrical cage.

8. The machine defined in claim 3 wherein said ring is formed of a plurality of separate segments.

9. The machine defined in claim 3 wherein said means for stabilizing is hardened insulating material throughout said domed end portion.

* * * * *